(12) United States Patent
Sakaida

(10) Patent No.: US 8,314,851 B2
(45) Date of Patent: Nov. 20, 2012

(54) IMAGE PROCESSING APPARATUS, METHOD FOR PROCESSING IMAGE, AND STORAGE MEDIUM

(75) Inventor: Minoru Sakaida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 12/790,222

(22) Filed: May 28, 2010

(65) Prior Publication Data

US 2010/0309320 A1 Dec. 9, 2010

(30) Foreign Application Priority Data

Jun. 3, 2009 (JP) .................................. 2009-134186
Feb. 24, 2010 (JP) .................................. 2010-039068

(51) Int. Cl.
*H04N 9/73* (2006.01)
*G06K 9/00* (2006.01)
*G06K 9/40* (2006.01)

(52) U.S. Cl. ...................... 348/223.1; 382/162; 382/275

(58) Field of Classification Search .................. 348/294, 348/221.1, 229.1, 362–368, 241; 382/284, 382/275, 162

See application file for complete search history.

(56) References Cited

U.S. PATENT DOCUMENTS

| 6,853,400 | B1 | 2/2005 | Matama | |
|---|---|---|---|---|
| 2006/0039590 | A1* | 2/2006 | Lachine et al. | 382/128 |
| 2009/0148015 | A1* | 6/2009 | Bohm et al. | 382/128 |
| 2009/0257672 | A1* | 10/2009 | Sullender | 382/260 |
| 2010/0239184 | A1* | 9/2010 | Furukawa et al. | 382/284 |

FOREIGN PATENT DOCUMENTS

JP 2000-076428 A 3/2000
JP 2007-195122 A 8/2007

* cited by examiner

*Primary Examiner* — Lin Ye
*Assistant Examiner* — Mekonnen Dagnew
(74) *Attorney, Agent, or Firm* — Canon U.S.A., Inc. I.P. Division

(57) ABSTRACT

When calculating the amount of color blur suppression based on gradient values at edge portions of image data, the degree of color blur suppression has been different between a non-addition readout method and an addition readout method even with an identical subject. To solve this problem, there is provided an image processing apparatus that calculates a suppression coefficient so as to suppress color blur when a gradient value exceeds a threshold value, and sets up the threshold value so that the gradient value range required for color blur suppression when an image sensor is driven by the addition readout method to generate image data is wider than the gradient value range required when the image sensor is driven by the non-addition readout method.

12 Claims, 17 Drawing Sheets

FIG. 2
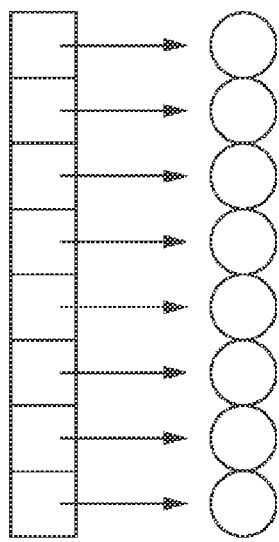
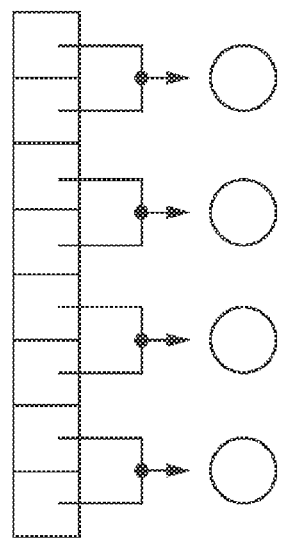
▯ : SENSOR PIXEL ARRAY
◯ : OUTPUT SIGNAL
(NON-ADDITION READOUT)
▯ : SENSOR PIXEL ARRAY
◯ : OUTPUT SIGNAL
(VERTICAL 2-PIXEL ADDITION READOUT)

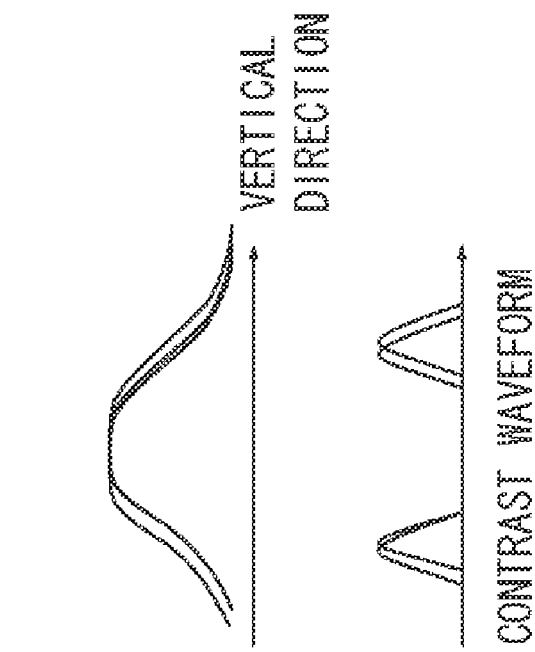
FIG. 6A (NON-ADDITION READOUT)
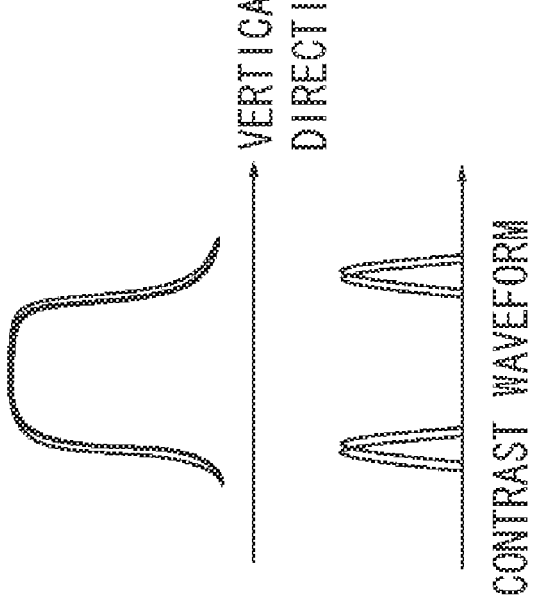
FIG. 6B (VERTICAL 2-PIXEL ADDITION READOUT)

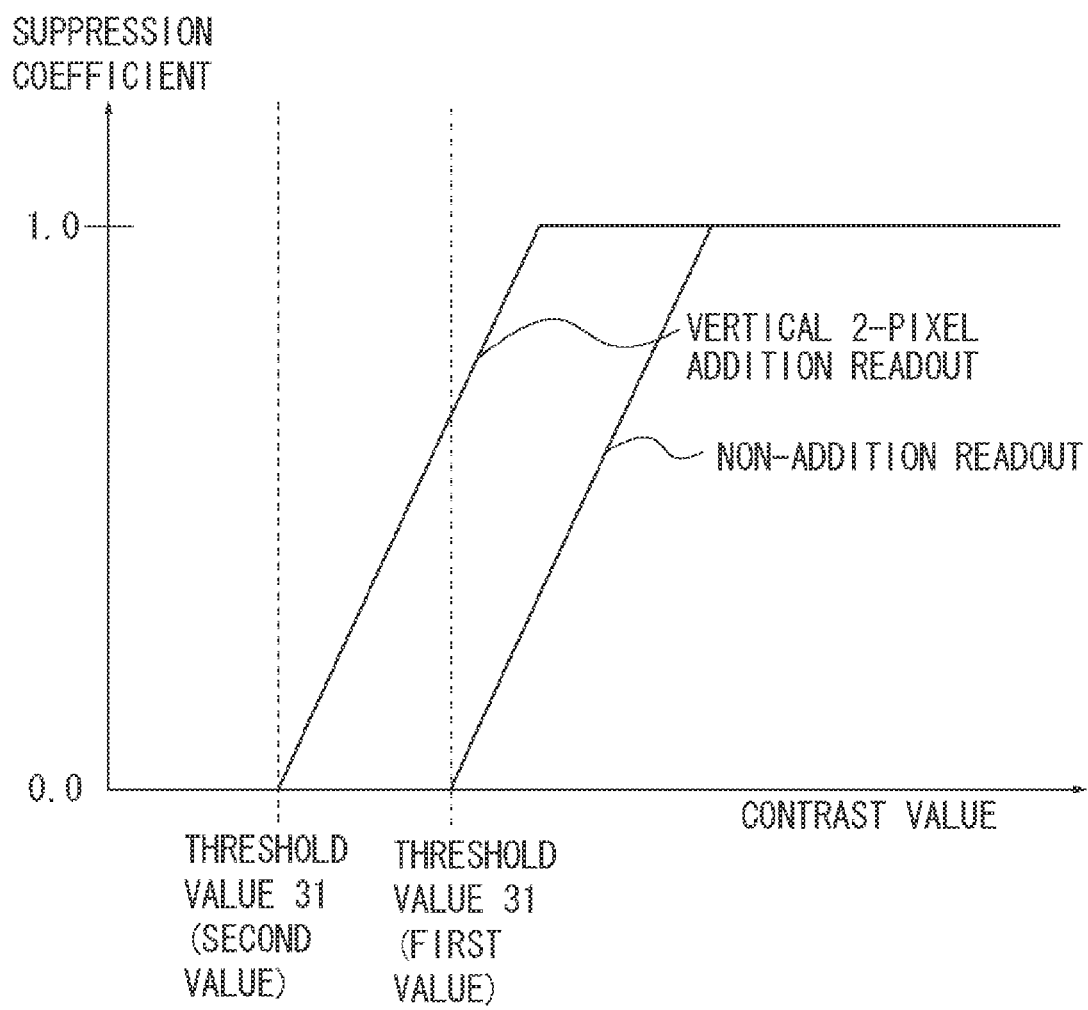

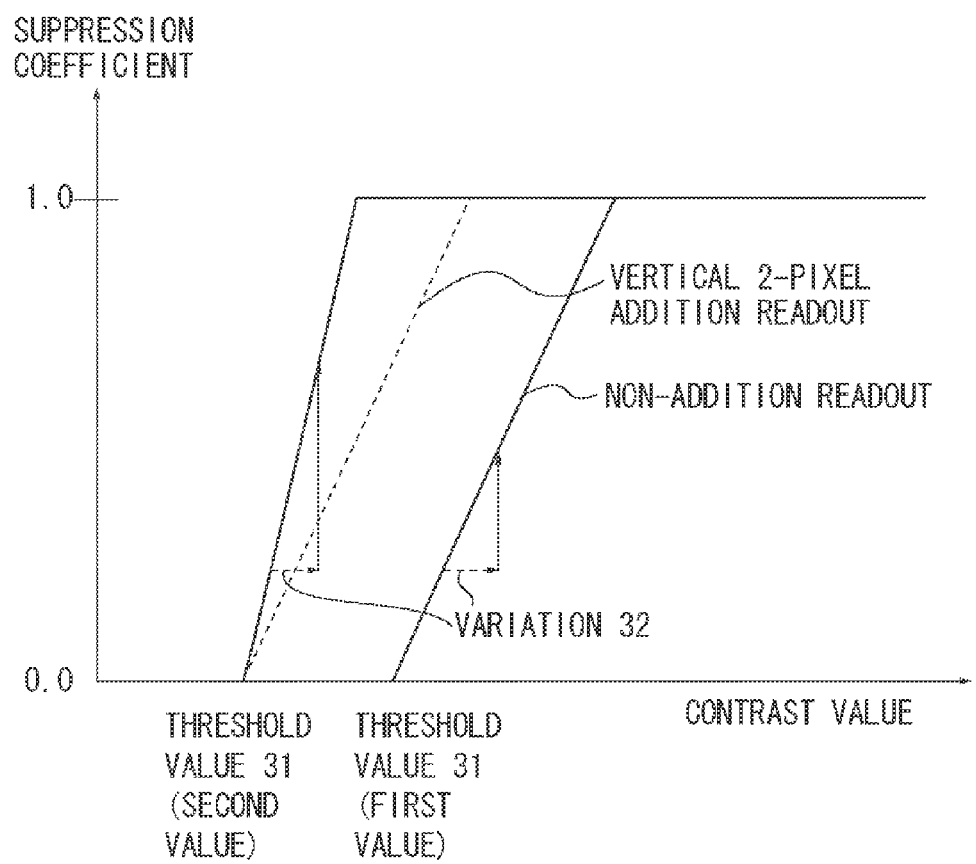

FIG. 9
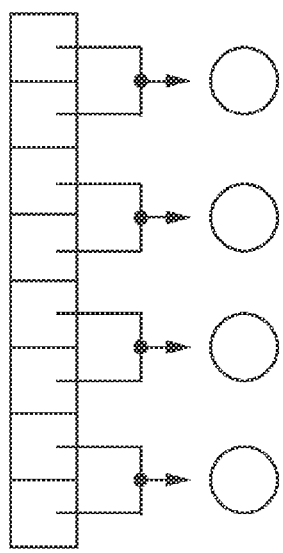
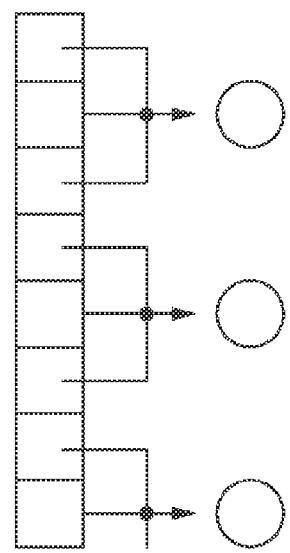
▯ :SENSOR PIXEL ARRAY
⊗ :OUTPUT SIGNAL
(VERTICAL 2-PIXEL
ADDITION READOUT)
▯ :SENSOR PIXEL ARRAY
⊗ :OUTPUT SIGNAL
(VERTICAL 3-PIXEL
ADDITION READOUT)

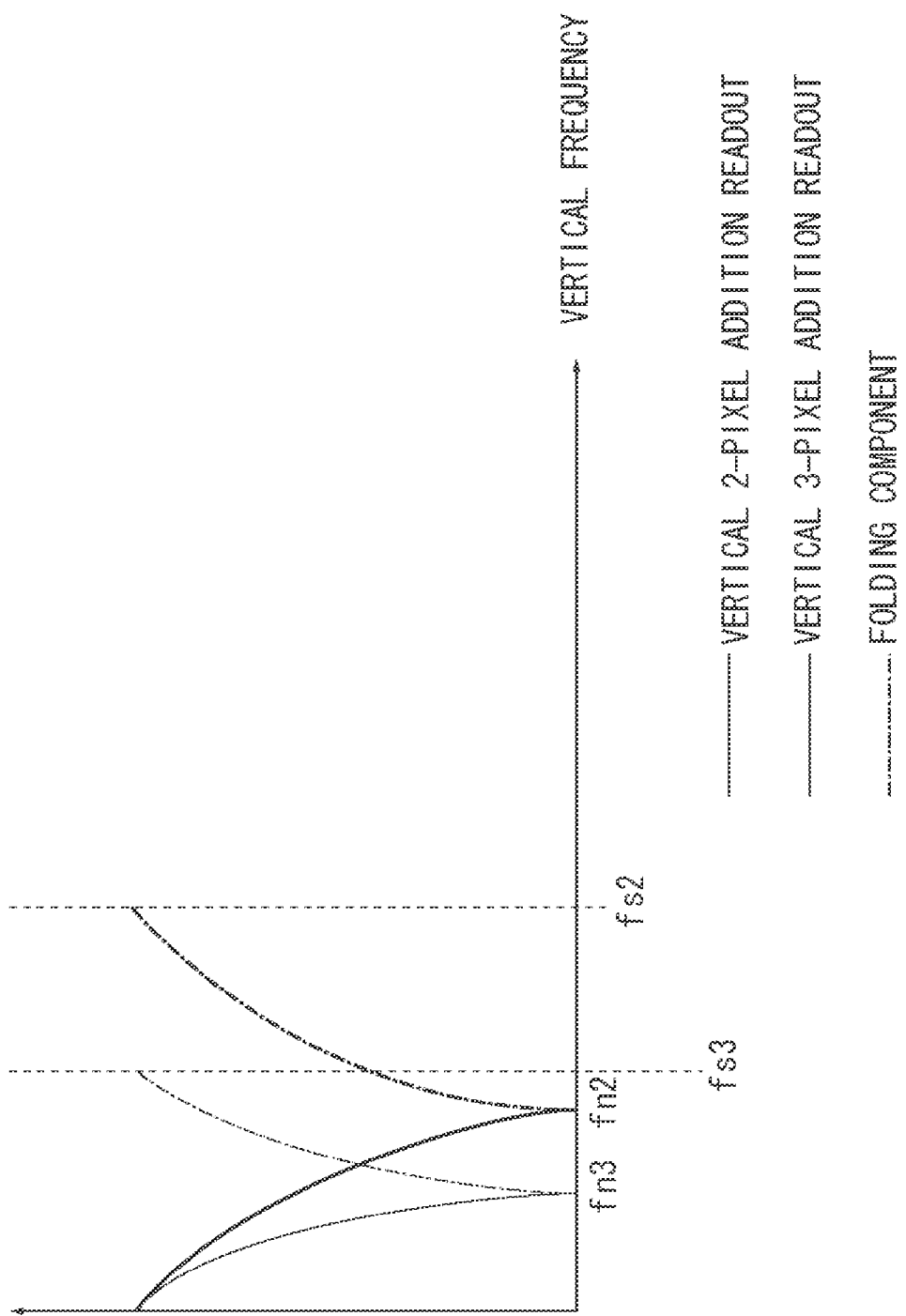

(VERTICAL 2-PIXEL ADDITION READOUT)

(VERTICAL 3-PIXEL ADDITION READOUT)

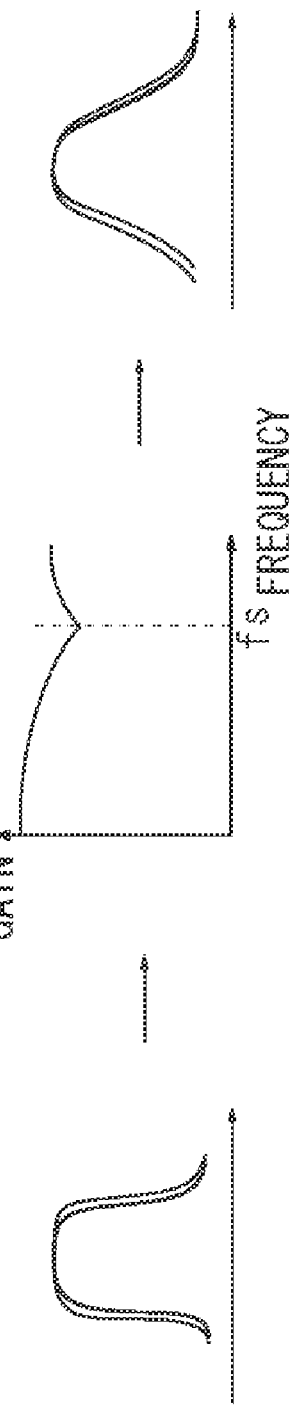
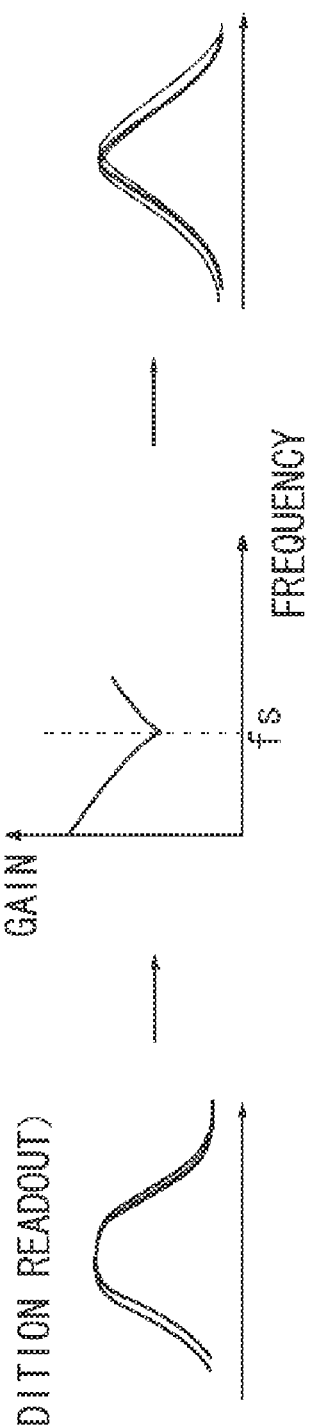

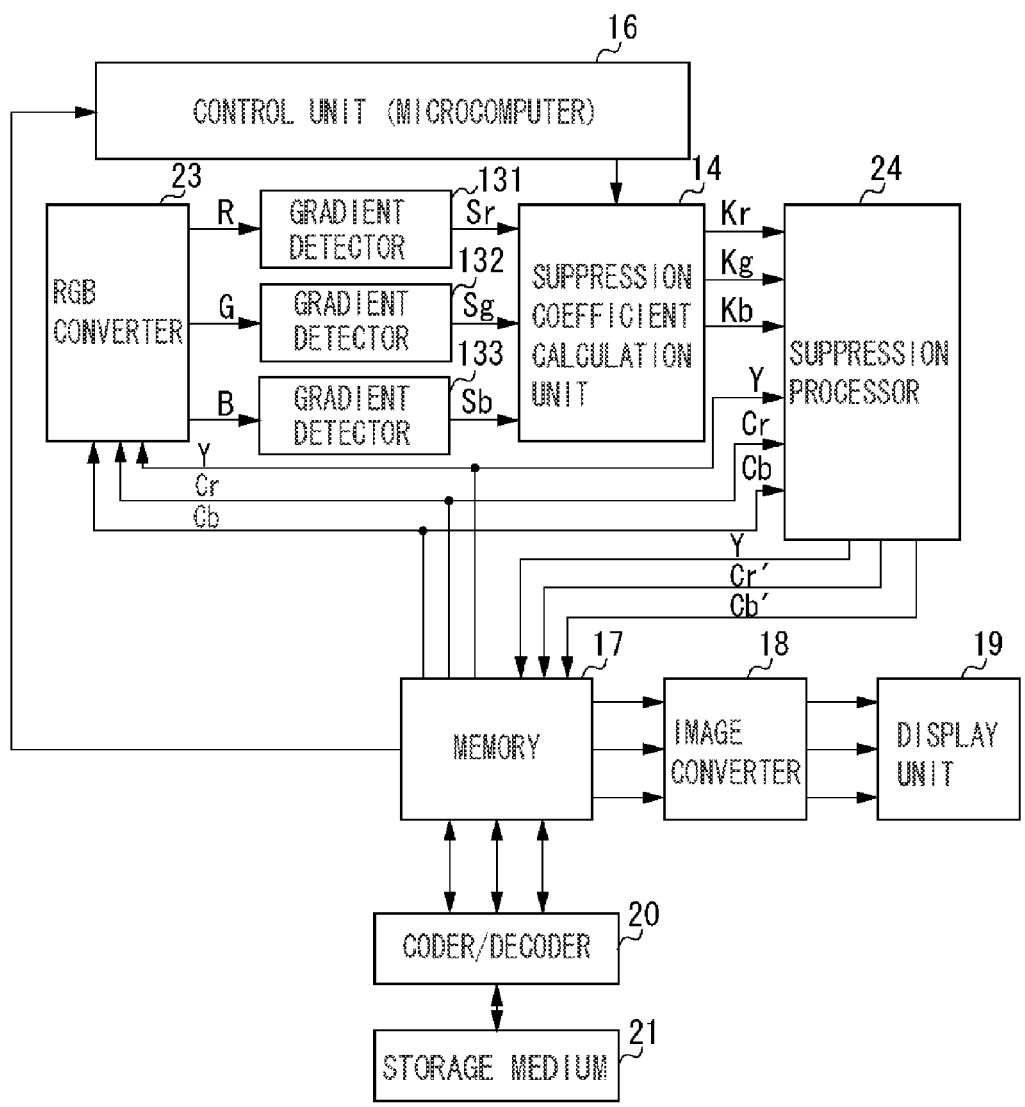

IMAGE PROCESSING APPARATUS, METHOD FOR PROCESSING IMAGE, AND STORAGE MEDIUM

BACKGROUND OF THE INVENTION

1. Field of the Invention

The present invention relates to an image processing apparatus and an image processing method. More particularly, the present invention relates to an image processing apparatus, an image processing method, and a program for correcting chromatic aberration caused by optical factors and suppressing color blur.

2. Description of the Related Art

Recent digital camcorders and digital cameras employ an image sensor having a large number of pixels to provide high-quality images. On the other hand, with pixel miniaturization and a decrease in lens size, color blur due to chromatic aberration is likely to occur because of wavelength-induced fluctuations in imaging position. Various methods have been proposed as techniques for suppressing color blur in a captured image.

For example, Japanese Patent Application Laid-Open No. 2000-076428 discusses a technique for suppressing color blur where a lens used for image capture is identified, relevant chromatic aberration information is read to generate correction parameters, and coordinates of target color signals are shifted based on the correction parameters.

However, the color blur characteristics intricately change with the image height position from the optical axis center to the pixel of interest, zoom lens position, diaphragm aperture diameter, and focus lens position. With the configuration discussed in Japanese Patent Application Laid-Open No. 2000-076428, in which the chromatic aberration information is read, chromatic aberration information is stored for each of the image height position, zoom lens position, diaphragm aperture diameter, focus lens position, and lens type.

Therefore, a large memory capacity is necessary to store these pieces of chromatic aberration information. Further, color blur may largely spread under certain photographing conditions, such as sunbeams streaming through leaves.

Another technique for suppressing color blur is proposed. With this technique, instead of reading prestored lens chromatic aberration information, an area in which color blur occurs is extracted and color blur suppression is applied to the area. For example, Japanese Patent Application Laid-Open No. 2007-195122 discusses a technique for suppressing color blur of image data based on gradient values of edges of the image data.

However, when suppressing color blur of image data based on gradient values of edges of the image data, a change in frequency characteristics of the image data input to the color blur suppression processor may cause insufficient or excessive color blur suppression possibly degrading the image quality. For example, when an image sensor is driven by a plurality of driving methods such as addition readout and non-addition readout, the frequency characteristics of image data generated by the image sensor change depending on the selected driving method.

When the method for driving the image sensor is changed from non-addition readout to addition readout, high-frequency components in the image data decrease by the addition average of pixel output signals. More specifically, even with an identical subject, an addition readout method may provide smaller gradient values of image data than a non-addition readout method.

Therefore, the amount of color blur suppression calculated based on gradient values of edges of image data has been different between the non-addition readout method and the addition readout method.

SUMMARY OF THE INVENTION

The present invention is directed to an image processing apparatus and an image processing method capable of suitable color blur suppression even when the method for driving the image sensor is changed.

According to an aspect of the present invention, an image processing apparatus includes a gradient detection unit configured to obtain a gradient value from image data, a suppression coefficient calculation unit configured to calculate a suppression coefficient based on the gradient value, a suppression unit configured to perform image processing to suppress color blur in an area of the image data to be subjected to color blur suppression, based on the suppression coefficient, wherein, when the gradient value exceeds a threshold value, the suppression coefficient calculation unit calculates the suppression coefficient so as to suppress color blur in the area to be subjected to color blur suppression, and wherein the suppression coefficient calculation unit sets the threshold value so that a gradient value range required for color blur suppression when an image sensor is driven by an addition readout method to generate the image data is wider than a gradient value range required when the image sensor is driven by a non-addition readout method.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates a relation between the pixel position of an image sensor 11 composed of three CMOS sensor plates and the form of signals output therefrom.

FIG. 6A illustrates vertical output values of image data (top) and the gradient of the vertical output values of the image data (bottom) in the case of non-addition readout, and FIG. 6B illustrates vertical output values of image data (top) and the gradient of the vertical output values of the image data (bottom) in the case of vertical 2-pixel addition readout.

FIG. 7 illustrates threshold values 31 respectively set to different values between non-addition readout and vertical 2-pixel addition readout.

FIG. 8 illustrates threshold values 31 and variations 32 respectively set to different values between non-addition readout and vertical 2-pixel addition readout.

FIG. 9 illustrates a relation between a pixel position of an image sensor 11 composed of three CMOS sensor plates and the form of signals output therefrom when the vertical 2-pixel addition readout method is used, and a relation therebetween when the vertical 3-pixel addition readout method is used.

FIG. 10 illustrates a sampling frequency fs1 and a Nyquist frequency fn1 in the case of vertical 2-pixel addition readout, and a sampling frequency fs2 and a Nyquist frequency fn2 in the case of vertical 3-pixel addition readout.

FIG. 14A illustrates image data output in the case of non-addition readout, FIG. 14B illustrates the characteristics of a band-limit filter for the image data illustrated in FIG. 14A, FIG. 14C illustrates image data obtained by applying band-limitation to the image data illustrated in FIG. 14A, FIG. 14D illustrates image data output in the case of vertical 2-pixel addition readout, FIG. 14E indicates the characteristics of a band-limit filter for the image data illustrated in FIG. 14D, and FIG. 14F illustrates image data obtained by applying band-limitation to the image data illustrated in FIG. 14D.

FIG. 15 is a block diagram illustrating an image reproducing apparatus as an exemplary image processing apparatus according to a fourth exemplary embodiment of the present invention.

DESCRIPTION OF THE EMBODIMENTS

Various exemplary embodiments, features, and aspects of the invention will be described in detail below with reference to the drawings.

Figure 1:
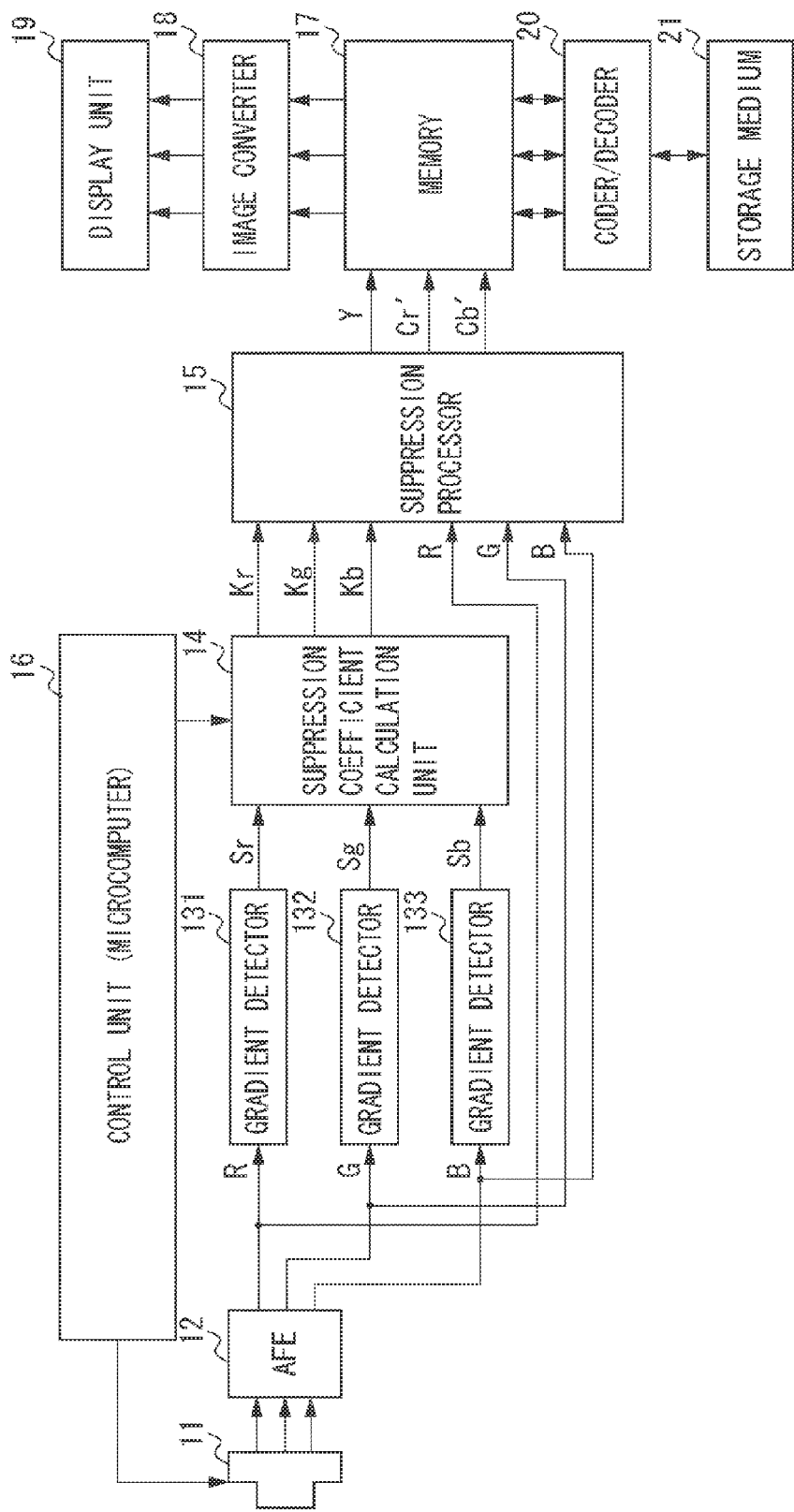
FIG. 1 is a block diagram illustrating an imaging apparatus as an exemplary image processing apparatus according to a first exemplary embodiment of the present invention.

FIG. 1 is a block diagram illustrating an imaging apparatus as an exemplary image processing apparatus according to a first exemplary embodiment of the present invention. The imaging apparatus may be, for example, a digital camera or digital camcorder.

Referring to FIG. 1, an image sensor 11 is a photoelectric conversion element for converting a captured subject image into electric signals, such as a complementary metal oxide semiconductor (CMOS) sensor and a charge coupled device (CCD) sensor. In the present exemplary embodiment, the image sensor 11 includes three CMOS sensor plates, which respectively output signals corresponding to R (red), G (green), and B (blue).

An analog front end (AFE) 12 is an analog front-end circuit that converts analog RGB signals output from the image sensor 11 into digital RGB signals. Hereinafter, the digital signals output from the AFE 12 are collectively referred to as image data.

A gradient detector 131 calculates a gradient value Sr denoting the gradient of the R digital signal output from the AFE 12. A gradient detector 132 calculates a gradient value Sg denoting the gradient of the G digital signal output from the AFE 12. A gradient detector 133 calculates a gradient value Sb denoting the gradient of the B digital signal output from the AFE 12.

A suppression coefficient calculation unit 14 calculates suppression coefficients (Kr, Kg, and Kb) for each RGB color of the image data based on gradient values (Sr, Sg, and Sb) for each RGB color output from the gradient detectors 131 to 133 and setting information output from a control unit 16 (described below). The suppression coefficient calculation unit 14 outputs the suppression coefficients (Kr, Kg, and Kb) to a suppression processor 15.

The suppression processor 15 calculates a luminance signal Y and color-difference signals Cr and Cb based on the image data output from the AFE 12. Then, based on the suppression coefficients (Kr, Kg, and Kb) for each RGB color output from the suppression coefficient calculation unit 14, the suppression processor 15 calculates a suppression coefficient for each of the color-difference signals Cr and Cb, and then applies color blur suppression processing to the color-difference signals Cr and Cb. Then, the suppression processor 15 outputs color-difference signals Cr' and Cb' after color blur suppression processing and the luminance signal Y as image data after color blur suppression.

The control unit 16 is a microcomputer, which selects the method for driving the image sensor 11. In the present exemplary embodiment, the control unit 16 instructs the image sensor 11 to change the driving method between vertical 2-pixel addition readout and non-addition readout. The control unit 16 outputs setting information to the suppression coefficient calculation unit 14 according to the driving method instruction given to the image sensor 11.

A memory 17 temporarily stores the image data composed of Y, Cr', and Cb' output from the suppression processor 15 as well as the image data read from a storage medium 21 and decoded by a coder/decoder 20.

An image converter 18 reads the image data stored in the memory 17 and then converts the image data into a format suitable for a display unit 19. The display unit 19, e.g., a liquid crystal display (LCD), displays images by using the image data converted by the image converter 18.

The coder/decoder 20 codes the image data stored in the memory 17, and stores the coded data in the storage medium 21. The coder/decoder 20 also decodes image data read from the storage medium 21 and stores the decoded data in the memory 17. The storage medium 21 is capable of storing not only image data generated by the imaging apparatus but also image data written by external apparatuses together with coded drive information on an image sensor used to capture the image data.

FIG. 2 illustrates a phase relation between the pixel position of the image sensor 11 composed of three CMOS sensor plates and the form of signals output therefrom. When the image sensor 11 is driven by a non-addition readout method, pixel signals from each of the three sensor plates are output as image data in original form. When the image sensor 11 is driven by the vertical 2-pixel addition readout method, pixel signals from each of the three sensor plates are processed in such a manner that signals of every vertical 2 pixels are addition-averaged, and resultant signals are output as image data.

Each of the gradient detectors 131 to 133 performs first-order differentiation of the image data to calculate its gradient values. In the present exemplary embodiment, a Sobel filter is used to obtain variations between pixels of the image data.

Figure 3:
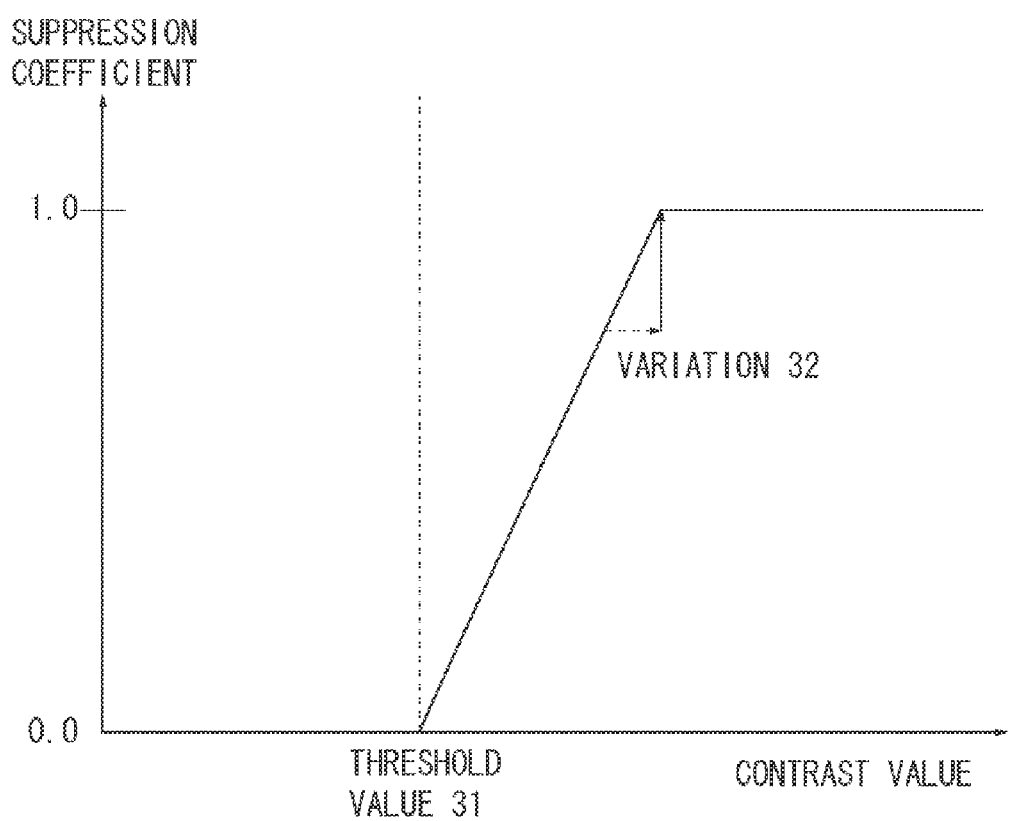
FIG. 3 illustrates a color blur suppression function representing a relation between a gradient value and a suppression coefficient.

The suppression coefficient calculation unit 14 determines a suppression coefficient for each color from the gradient values calculated by the gradient detectors 131 to 133. FIG. 3 illustrates a color blur suppression function representing a relation between a gradient value and a suppression coefficient.

As illustrated in FIG. 3, the suppression coefficient is set to 0.0 to 1.0 in a step pattern. A suppression coefficient of 0.0 means that the color blur suppression processing is not performed. The larger the suppression coefficient, the larger becomes the extent of color blur suppression.

A threshold value 31 is set for a gradient value. When the gradient value equals the threshold value 31 or below, the suppression coefficient is set to 0.0. When the gradient value exceeds the threshold value 31, the suppression coefficient increases in proportion to the increase in gradient value. When the suppression coefficient reaches 1.0, it is retained to 1.0 regardless of further increase in gradient value.

The suppression coefficient is obtained for each RGB color. The suppression coefficients Kr, Kg, and Kb are calculated from the gradient values Sr, Sg, and Sb, respectively, and then output to the suppression processor 15.

The suppression coefficient calculation unit 14 can change the gradient value range subjected to color blur suppression by changing the threshold value 31. Likewise, the suppression coefficient calculation unit 14 can change the strength of color blur suppression with respect to the gradient value by changing a variation 32.

The control unit 16 outputs the threshold value 31 and the variation 32 to the suppression coefficient calculation unit 14 as the setting information. In other words, the control unit 16 can control the gradient value range subjected to color blur suppression as well as the strength of color blur suppression with respect to the gradient value.

Figure 4:
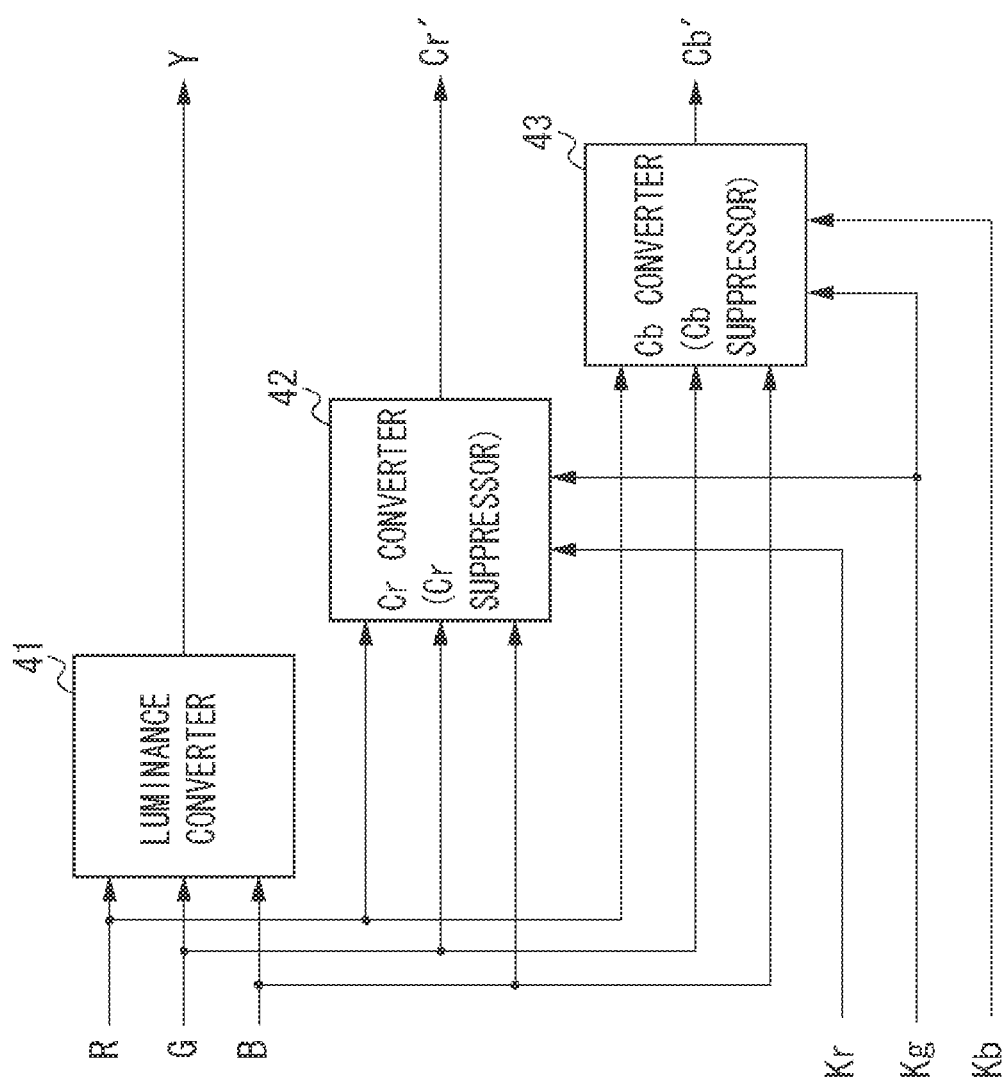
FIG. 4 is a block diagram illustrating an internal configuration of the suppression processor 15 of FIG. 1.

FIG. 4 is a block diagram illustrating an internal configuration of the suppression processor 15.

A luminance converter 41 generates a luminance signal Y from the digital RGB signals output from the AFE 12. A Cr converter 42 and a Cb converter 43 generate color-difference signals Cr and Cb, respectively, from the digital RGB signals. Since the technique for generating the luminance signal Y and the color-difference signals Cr and Cb from the digital RGB signals is well known, detailed descriptions thereof are not included herein.

From the suppression coefficients Kr and Kg calculated by the suppression coefficient calculation unit 14, the Cr converter 42 calculates a suppression coefficient Kcr for the color-difference signal Cr by using the following formula (1).

$$Kcr=1-(0.8 \times Kr+0.2 \times Kg) \qquad (1)$$

The Cr converter 42 outputs a product of the suppression coefficient Kcr and the color-difference signal Cr as a color-difference signal Cr' after color blur suppression processing. When the gradient value Sr for the R digital signal and the gradient value Sg for the G digital signal are large enough, both the suppression coefficients Kr and Kg become 1.0 because of the suppression function illustrated in FIG. 3. Therefore, the suppression coefficient Kcr becomes 0 and so does the color-difference signal Cr'.

On the other hand, when both the gradient values Sr and Sg are small enough, both the suppression coefficients Kr and Kg become 0.0 because of the suppression function illustrated in FIG. 3. Therefore, the suppression coefficient Kcr becomes 1 and the value of the color-difference signal Cr is output as it is as the color-difference signal Cr'.

Further, when the gradient value Sr is small, color blur is not likely to occur regardless of the gradient value Sg. In this case, since the suppression coefficient Kcr is comparatively close to 1, the value of the color-difference signal Cr is output as the color-difference signal Cr' without significantly being reduced. In this way, the gradient values of an area are used not only to determine whether the area is subjected to color blur suppression but also to determine the degree of color blur suppression processing.

Likewise, from the suppression coefficients Kb and Kg calculated by the suppression coefficient calculation unit 14, the Cb converter 43 calculates a suppression coefficient Kcb for the color-difference signal Cb by using the following formula (2).

$$Kcb=1-(0.8 \times Kb+0.2 \times Kg) \qquad (2)$$

The Cb converter 43 outputs a product of the suppression coefficient Kcb and the color-difference signal Cb as the color-difference signal Cb' after color blur suppression processing.

Figure 5:
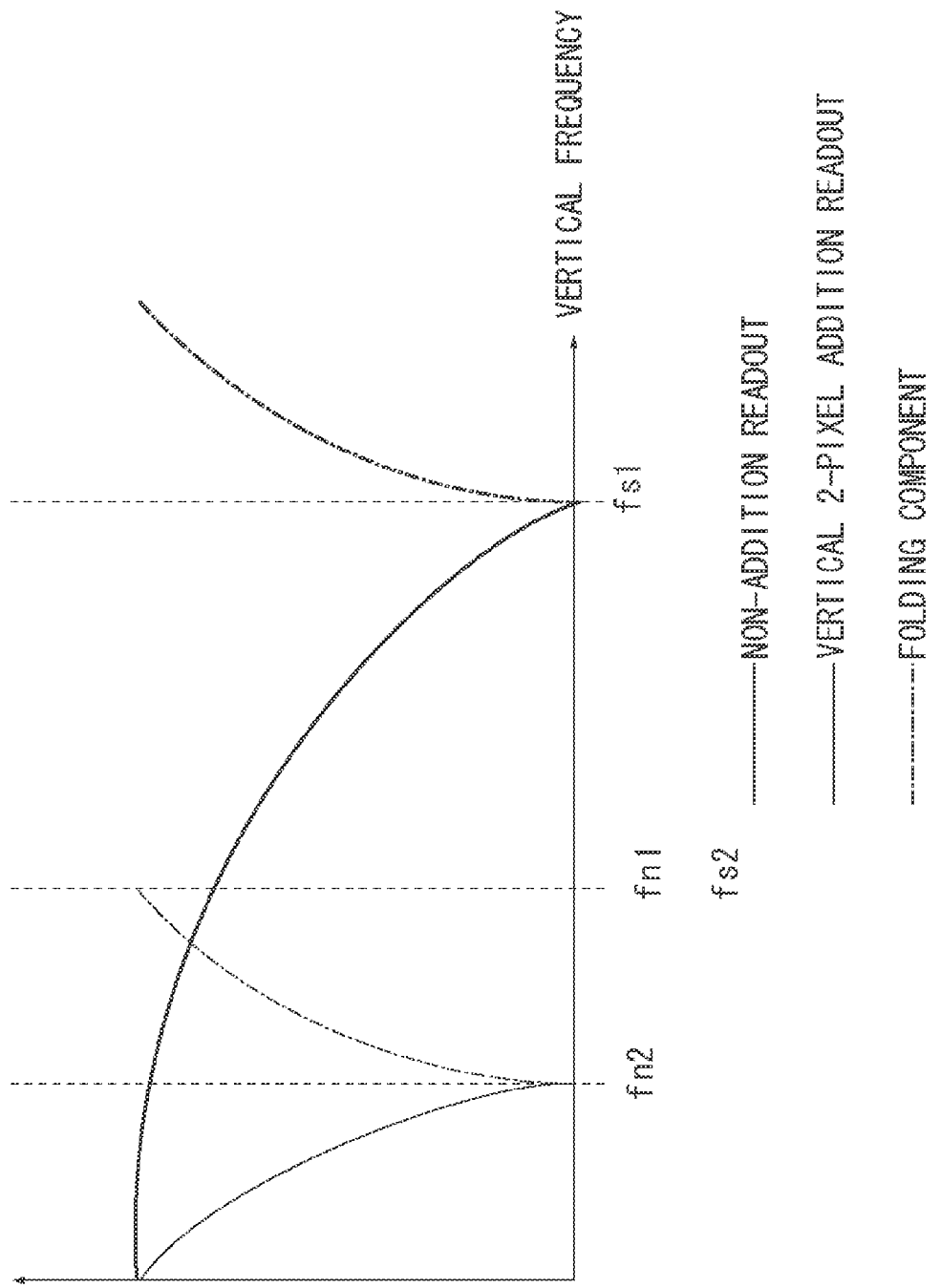
FIG. 5 illustrates a sampling frequency fs1 and a Nyquist frequency fn1 in the case of non-addition readout, and a sampling frequency fs2 and a Nyquist frequency fn2 in the case of vertical 2-pixel addition readout.

FIG. 5 illustrates a sampling frequency fs1 and a Nyquist frequency fn1 in the case of non-addition readout, and a sampling frequency fs2 and a Nyquist frequency fn2 in the case of vertical 2-pixel addition readout. As illustrated in FIG. 5, the sampling frequency fs2 when the image sensor 11 is driven by the vertical 2-pixel addition readout method is a half of the sampling frequency fs1 when the image sensor is driven by the non-addition readout method.

FIG. 6A illustrates vertical output values of image data (top) and the rate of change in (gradient of) vertical output values of the image data (bottom) when the image sensor 11 is driven by the non-addition readout method. FIG. 6B illustrates vertical output values of image data (top) and the rate of change in (gradient of) vertical output values of the image data (bottom) when the image sensor 11 is driven by the vertical 2-pixel addition readout method. The subject is identical for both driving methods.

FIGS. 6A and 6B clearly illustrate color blur occurring under a condition that the vertical 2-pixel addition readout method provides smaller gradient values of the image data than the non-addition readout method. Therefore, the vertical 2-pixel addition readout method requires a wider gradient value range to be subjected to color blur suppression processing than the non-addition readout method.

As illustrated in FIG. 7, when the control unit 16 instructs the image sensor 11 to select non-addition readout, it instructs the suppression coefficient calculation unit 14 to select a first value (initial setting) as the threshold value 31 in the setting information. When the control unit 16 instructs the image sensor 11 to select vertical 2-pixel addition readout, it instructs the suppression coefficient calculation unit 14 to select a second value that is smaller than the first value, as the threshold value 31 in the setting information.

As a result, the vertical 2-pixel addition readout method applies color blur suppression processing to a wider gradient value range and accordingly to smaller gradient values than the non-addition readout method. In other words, the vertical 2-pixel addition readout method sets up a wider gradient value range to be subjected to color blur suppression processing than the non-addition readout method.

As illustrated in FIG. 8, when the control unit 16 instructs the image sensor 11 to select vertical 2-pixel addition readout, it may instruct the suppression coefficient calculation unit 14 to select a larger variation 32 than that for non-addition readout. In this way, the vertical 2-pixel addition readout method applies a larger degree of color blur suppression processing and accordingly more active suppression processing to color blur with smaller gradient values than the non-addition readout method.

As described above, according to the present exemplary embodiment, the control unit 16 changes the gradient value range to be subjected to color blur suppression processing depending on whether the image sensor 11 is driven by the addition or non-addition readout method. This configuration makes suitable color blur suppression processing possible even when the method for driving the image sensor 11 is changed between addition readout and non-addition readout.

A second exemplary embodiment will be described below. The configuration of an imaging apparatus as an exemplary image processing apparatus according to the second exemplary embodiment is similar to that of the first exemplary embodiment illustrated in FIG. 1. The present exemplary embodiment differs from the first exemplary embodiment in that the method for driving the image sensor 11 can be changed between non-addition readout, vertical 2-pixel addition readout, and vertical 3-pixel addition readout by an instruction from the control unit 16.

FIG. 9 illustrates a phase relation between the pixel position of the image sensor 11 composed of three CMOS sensor plates and the form of signals output therefrom when the vertical 2-pixel addition readout method is used, and a relation therebetween when the vertical 3-pixel addition readout method is used. When the image sensor 11 is driven by the vertical 3-pixel addition readout method, pixel signals from each of the three sensor plates are processed in such a manner that signals of every vertical 3 pixels are addition-averaged, and resultant signals are output as image data.

FIG. 10 illustrates a sampling frequency fs2 and a Nyquist frequency fn2 in the case of vertical 2-pixel addition readout, and a sampling frequency fs3 and a Nyquist frequency fn3 in the case of vertical 3-pixel addition readout. As illustrated in FIG. 10, the sampling frequency decreases with increasing number of pixels to be addition-averaged (hereinafter these pixels are referred to as addition-averaged pixels).

Figure 11A:
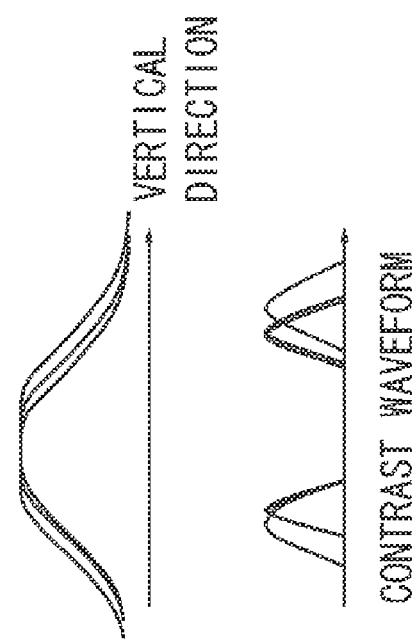
FIG. 11A illustrates vertical output values of image data (top) and the gradient of the vertical output values of the image data (bottom) in the case of vertical 2-pixel addition readout.
Figure 11B:
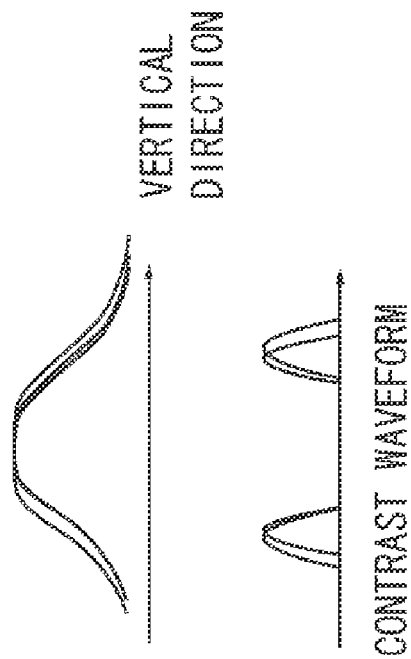
FIG. 11B illustrates vertical output values of image data (top) and the gradient of the vertical output values of the image data (bottom) in the case of vertical 3-pixel addition readout.

FIG. 11A illustrates vertical output values of image data (top) and the rate of change in (gradient of) vertical output values of the image data (bottom) when the image sensor 11 is driven by the vertical 2-pixel addition readout method. FIG. 11B illustrates vertical output values of image data (top) and the rate of change in (gradient of) vertical output values of the image data (bottom) when the image sensor 11 is driven by the vertical 3-pixel addition readout method. The subject is identical for both driving methods.

FIGS. 11A and 11B illustrate color blur occurring under a condition that the vertical 3-pixel addition readout method provides smaller gradient values of the image data than the vertical 2-pixel addition readout method. Therefore, the vertical 3-pixel addition readout method requires a wider gradient value range to be subjected to color blur suppression processing than the vertical 2-addition readout method. In other words, the larger the number of addition-averaged pixels, the wider the gradient value range to be subjected to color blur suppression processing needs to be.

In the present exemplary embodiment, the control unit 16 sets a smaller value as the threshold value 31 in the setting information for a larger number of addition-averaged pixels in the case of addition readout of the image sensor 11. In other words, in the case of vertical 3-pixel addition readout, the control unit 16 changes the threshold value 31 to a smaller value than that in the case of vertical 2-pixel addition readout. Further, the control unit 16 may change the variation 32 to a larger value for a larger number of addition-averaged pixels in the case of addition readout of the image sensor 11.

As described above, according to the present exemplary embodiment, the gradient value range to be subjected to color blur suppression processing is changed according to the number of pixels in the case of addition readout of the image sensor 11.

More specifically, the control unit 16 changes the number of addition-averaged pixels in the case of addition readout of the image sensor 11 from the first number to a second number that is larger than the first number, thus extending the gradient value range to be subjected to color blur suppression processing. This configuration enables suitable color blur suppression processing even when the number of addition-averaged pixels is changed in the case of addition readout of the image sensor 11.

Figure 12:
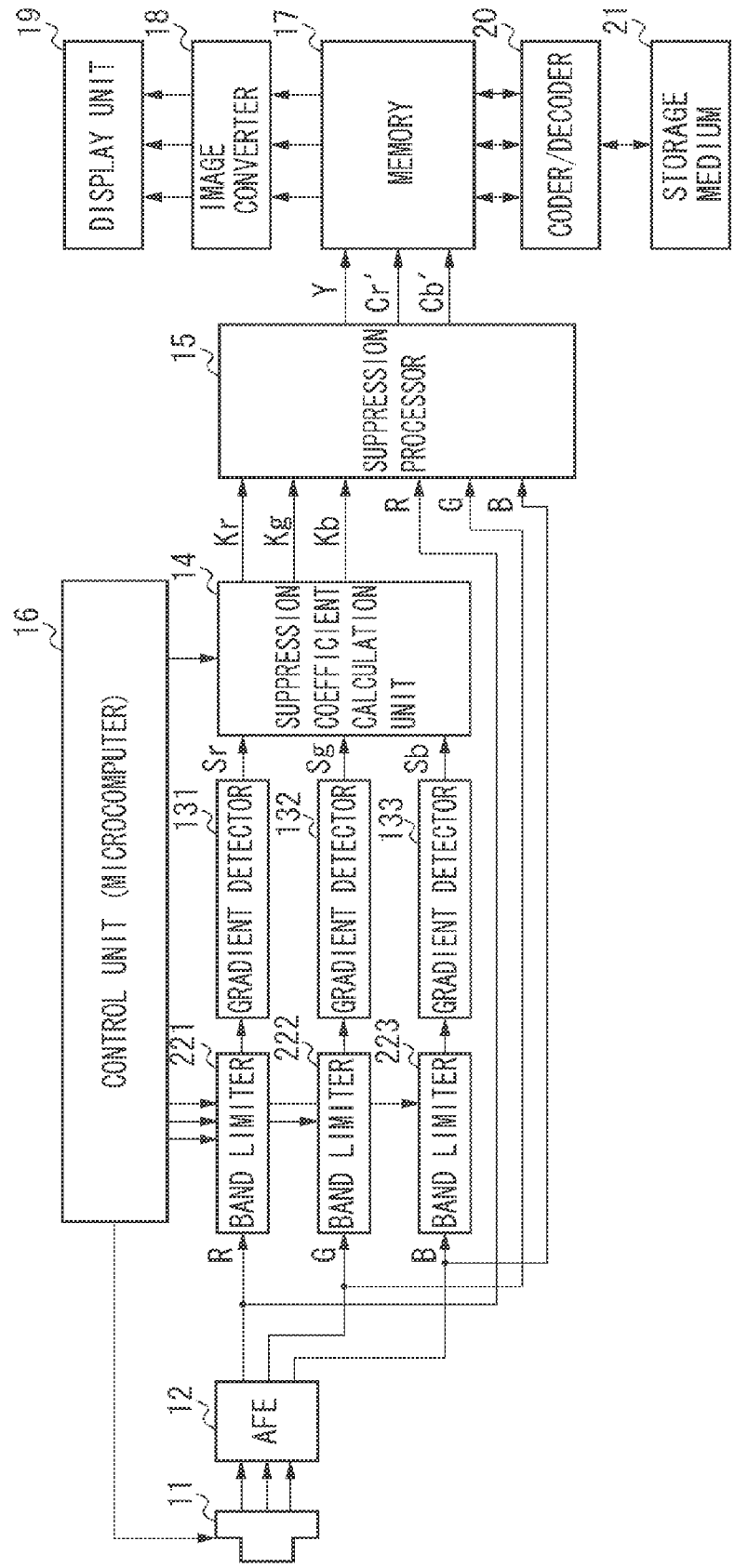
FIG. 12 is a block diagram illustrating an imaging apparatus as an exemplary image processing apparatus according to a third exemplary embodiment of the present invention.

A third exemplary embodiment will be described below. FIG. 12 is a block diagram illustrating an imaging apparatus such as a digital camera and digital camcorder as an exemplary image processing apparatus according to the third exemplary embodiment of the present invention.

The present exemplary embodiment differs from the first exemplary embodiment (the block diagram of FIG. 1) in that band limiters 221, 222, and 223 are provided between the AFE 12 and the gradient detectors 131, 132, and 133, respectively. Each of the band limiters 221 to 223 is provided with a function for changing the gradient value range detected from the image data. The control unit 16 outputs an instruction for changing a filter coefficient to each of the band limiters 221 to 223.

Figure 13A:
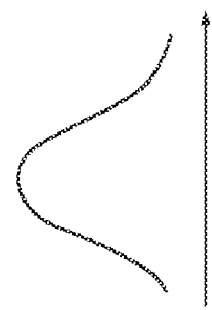
FIG. 13A illustrates the vertical output value of the image data.
Figure 13C:
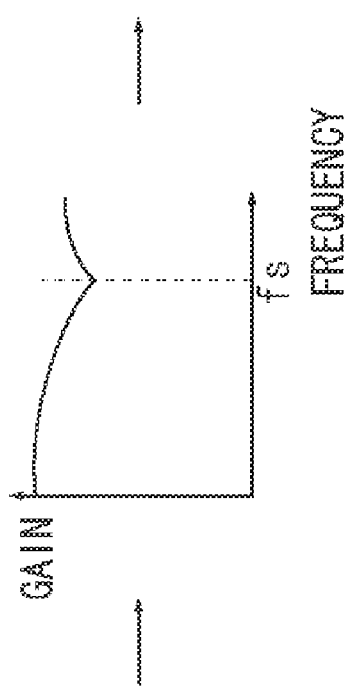
FIG. 13C illustrates a pass band for each band limiter.
Figure 13D:
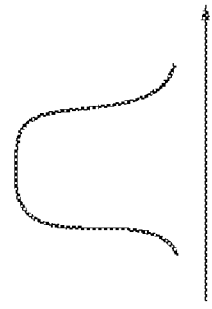
FIG. 13D illustrates the value of the image data obtained when the image data illustrated in FIG. 13A passes through the band limiters.
Figure 13B:
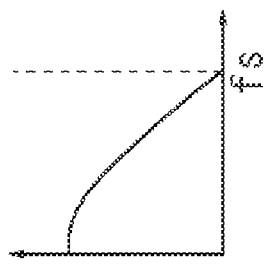
FIG. 13B illustrates the frequency characteristics of the image data illustrated in FIG. 13A.
Figure 13E:
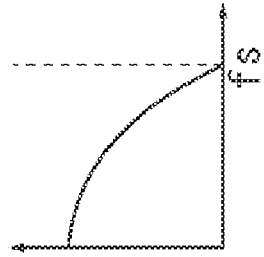
FIG. 13E illustrates the frequency band of the image data illustrated in FIG. 13D.

FIGS. 13A to 13E illustrate output values and frequency characteristics of image data before and after applying band limitation to the image data. FIG. 13A illustrates the vertical output value of the image data output from the AFE 12. FIG. 13B illustrates the frequency characteristics of the image data of FIG. 13A. FIG. 13C illustrates a pass band for each of the band limiters 221 to 223. FIG. 13D indicates the value of the image data obtained after the image data of FIG. 13A passes through the band limiters 221 to 223, and FIG. 13E illustrates the frequency band of the image data of FIG. 13D.

Each of the band limiters 221 to 223 changes a filter coefficient according to the instruction of the control unit 16 to change the pass band illustrated in FIG. 13C.

In the present exemplary embodiment, the image sensor 11 changes the driving method between vertical 2-pixel addition readout and non-addition readout. As illustrated in FIG. 5, the sampling frequency fs2 in the case of vertical 2-pixel addition readout is a half of the sampling frequency fs1 in the case of non-addition readout.

As mentioned in the first exemplary embodiment, FIGS. 6A and 6B illustrate color blur occurring under a condition that the vertical 2-pixel addition readout method provides smaller gradient values of the image data than the non-addition readout method. Therefore, the vertical 2-pixel addition readout method requires a wider apparent gradient portion as well as a wider gradient value range to be subjected to color blur suppression processing so that the vertical 2-pixel addition readout method provides easier detection of gradient values than the non-addition readout method.

Therefore, when the vertical image sensor 11 performs vertical 2-pixel addition readout, the control unit 16 instructs each of the band limiters 221 to 223 to change the filter coefficient to provide a smaller pass band than that for non-addition readout.

FIGS. 14A to 14F illustrate image data obtained with non-addition readout (top) and image data obtained with vertical 2-pixel addition readout (bottom) after applying band limitation. FIG. 14A illustrates image data output in the case of non-addition readout, FIG. 14B illustrates the characteristics of a band-limit filter for the image data of FIG. 14A, and FIG. 14C illustrates image data obtained by applying band-limitation to the image data of FIG. 14A.

FIG. 14D illustrates image data output in the case of vertical 2-pixel addition readout, FIG. 14E indicates the characteristics of a band-limit filter for the image data of FIG. 14D, and FIG. 14F illustrates image data obtained by applying band-limitation to the image data of FIG. 14D.

When the image data obtained with vertical 2-pixel addition readout illustrated in FIG. 14D is sent through a filter having a narrower pass-band setting than that for non-addition readout as illustrated in FIG. 14E, image data having wider gradient portions as illustrated in FIG. 14F is obtained.

Since the image data before passing the filter illustrated in FIG. 14D has a small gradient of output values at end positions of the gradient portion, it is difficult to subject the end portions to color blur suppression. However, when the image data is sent through the filter, it becomes possible to provide a gradient of output values also at end positions of the gradient portion as illustrated in FIG. 14F, making it easier to subject the relevant area to color blur suppression.

Then, as illustrated in FIG. 7, the control unit 16 outputs to the suppression coefficient calculation unit 14 the threshold value 31, which is smaller than that in the case of non-addition readout. As a result, the pixel range detected as a gradient portion on the image data is extended, and accordingly so is the gradient value range to be subjected to color blur suppression processing. Therefore, addition readout can apply color blur suppression processing to color blur due to smaller gradients than non-addition readout.

Likewise, as illustrated in FIG. 8, when the control unit 16 instructs the image sensor 11 to select vertical 2-pixel addition readout, it may instruct the suppression coefficient calculation unit 14 to set the variation 32 having a larger value than that in the case of non-addition readout.

Similarly to the second exemplary embodiment, the filter coefficient for each of the band limiters 221 to 223 may be changed when changing the number of addition-averaged pixels in the case of addition readout. The gradient of image data decreases with increasing number of addition-averaged pixels. Therefore, the larger the number of addition-averaged pixels, the narrower the pass-band setting for the filter characteristics of the band limiters 221 to 223 needs to be.

A fourth exemplary embodiment will be described below. FIG. 15 is a block diagram illustrating an image reproducing apparatus such as a photo storage as an exemplary image processing apparatus according to the fourth exemplary embodiment of the present invention.

The present exemplary embodiment differs from the first exemplary embodiment (the imaging apparatus illustrated in FIG. 1) in that a RGB converter 23 and a suppression processor 24 are provided instead of the image sensor 11, AFE 12, and the suppression processor 15, and in that the drive information read from the storage medium 21 is decoded and stored in the memory 17 by the coder/decoder 20, and the decoded information is transmitted to the control unit 16.

The storage medium 21 stores coded image data together with coded drive information on the readout method of the image sensor used to capture the image data. The coder/decoder 20 reads data from the storage medium 21, decodes it into Y—Cr—Cb-based image data, and stores the decoded image data in the memory 17 together with the drive information on the readout method of the image sensor.

The control unit 16 acquires the drive information stored in the memory 17 and, similarly to the first exemplary embodiment, outputs setting information to the suppression coefficient calculation unit 14 according to the readout method of the image sensor in the drive information.

The YCrCb-based image data stored in the memory 17 is output to the RGB converter 23 and the suppression processor 24. The RGB converter 23 converts the YCrCb-based image data into RGB-based image data by using a well-known method. Since the technique for generating digital RGB signals from the luminance signal Y and the color-difference signals Cr and Cb is well known, detailed description will not be included herein.

When RGB image data is obtained, the suppression coefficient calculation unit 14 calculates gradient values (Sr, Sg, and Sb) for each RGB color output from the gradient detectors 131 to 133, and also calculates suppression coefficients (Kr, Kg, and Kb) for each RGB color of the image data based on the setting information output from the control unit 16.

Figure 16:
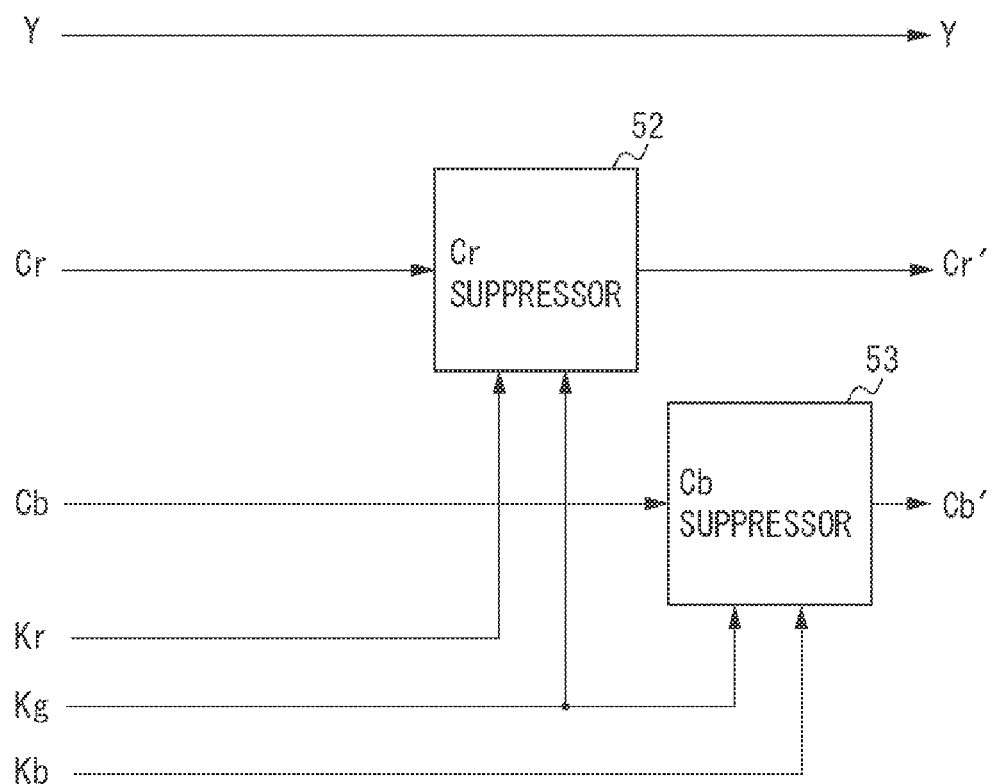
FIG. 16 is a block diagram illustrating an internal configuration of the suppression processor 24 of FIG. 15.

FIG. 16 is a block diagram illustrating an internal configuration of the suppression processor 24. Based on the suppression coefficients (Kr, Kg, and Kb) for each RGB color output from the suppression coefficient calculation unit 14, a Cr suppressor 52 and a Cb suppressor 53 calculate suppression coefficients for the color-difference signals Cr and Cb output from the memory 17, and apply color blur suppression processing to the color-difference signals Cr and Cb, respectively.

The method for calculating the suppression coefficients Kcr and Kcb for the color-difference signals Cr and Cb, and the color blur suppression processing therefor are similar to those described in the first exemplary embodiment. Then, the suppression processor 24 outputs the color-difference signals Cr' and Cb' that underwent color blur suppression processing and the luminance signal Y as image data after color blur suppression. The coder/decoder 20 codes the signals Y, Cr', and Cb' stored in the memory 17 and stores the coded data in the storage medium 21.

As described above, the present exemplary embodiment can obtain similar effect to each exemplary embodiment mentioned above not only as an imaging apparatus but also as an image reproducing apparatus.

Figure 17:
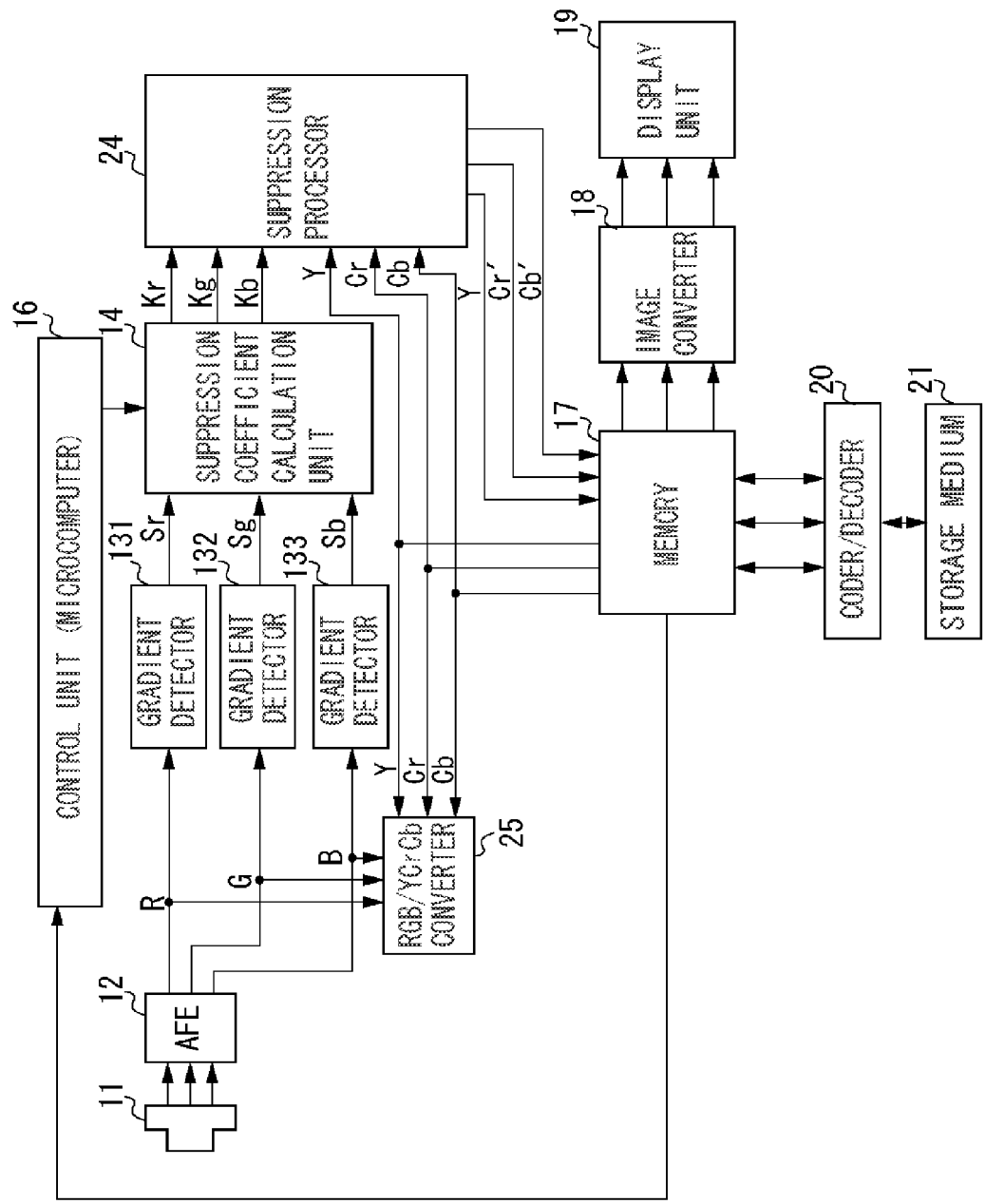
FIG. 17 is a block diagram illustrating an imaging apparatus as an exemplary image processing apparatus according to a fifth exemplary embodiment of the present invention.

A fifth exemplary embodiment will be described below. FIG. 17 is a block diagram illustrating an imaging apparatus such as a digital camera and digital camcorder as an exemplary image processing apparatus according to the fifth exemplary embodiment of the present invention. The imaging apparatus illustrated in FIG. 17 combines the configuration according to the first exemplary embodiment (FIG. 1) with the configuration according to the fourth exemplary embodiment (FIG. 15).

The imaging apparatus illustrated in FIG. 17 includes a RGB/YCrCb converter 25, which converts YCrCb-based image data into RGB-based image data and vice versa. The RGB/YCrCb converter 25 enables suitable color blur suppression processing to image data generated by the image sensor 11 as well as to image data read from the storage medium 21 depending on the method for driving the image sensor used to capture the image data.

The above-described exemplary embodiments can be attained not only as the imaging apparatus and image reproducing apparatus described above but also as software executed by a computer (or central processing unit (CPU), microprocessor unit (MPU), etc.) in a system or the apparatus. Color blur suppression processing may be applied to image data received in a storage medium.

Therefore, a computer program itself supplied to a computer to attain the above-mentioned exemplary embodiments also embodies the present invention. The computer program for attaining the above-mentioned exemplary embodiments may be stored in a computer-readable storage medium, for example, a floppy disk, hard disk, optical disk, magneto-optical disk (MO), CD-ROM, CD-R, CD-RW, magnetic tape, nonvolatile memory card, ROM, DVD (DVD-ROM or DVD-R), or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-134186 filed Jun. 3, 2009 and Application No. 2010-039068 filed Feb. 24, 2010, which are hereby incorporated by reference herein in its entirety.

What is claimed is:

1. An image processing apparatus comprising:
a gradient detection unit configured to obtain a gradient value from image data;
a suppression coefficient calculation unit configured to calculate a suppression coefficient based on the gradient value;
a suppression unit configured to perform image processing to suppress color blur in an area of the image data to be subjected to color blur suppression, based on the suppression coefficient, wherein, when the gradient value exceeds a threshold value, the suppression coefficient calculation unit calculates the suppression coefficient so as to suppress color blur in the area to be subjected to color blur suppression, and wherein
the suppression coefficient calculation unit sets the threshold value so that a gradient value range required for color blur suppression when an image sensor is driven by an addition readout method to generate the image data is wider than a gradient value range required when the image sensor is driven by a non-addition readout method; wherein
the suppression coefficient calculation unit is configured to calculate the suppression coefficient so that a gradient value range when the image sensor is driven by an addition-readout method to generate the image data is subjected to color blur suppression to a larger degree than a gradient value range when the image sensor is driven by a non-addition readout method.

2. An image processing apparatus comprising:
a gradient detection unit configured to obtain a gradient value from image data;
a suppression coefficient calculation unit configured to calculate a suppression coefficient based on the gradient value;
a suppression unit configured to perform image processing to suppress color blur in an area of the image data to be subjected to color blur suppression, based on the suppression coefficient, wherein, when the gradient value exceeds a threshold value, the suppression coefficient calculation unit calculates the suppression coefficient so as to suppress color blur in the area to be subjected to color blur suppression, and
wherein the suppression coefficient calculation unit sets the threshold value so that the gradient value range required for color blur suppression when an image sensor is driven by a second addition readout method involving addition average of a second number of pixels to generate the image data is wider than the gradient value range required when the image sensor is driven by a first addition readout method involving addition average of a first number of pixels, wherein the second number is larger than the first number; and
wherein the suppression coefficient calculation unit is configured to calculate the suppression coefficient so that the gradient value range when the image sensor is driven by the second addition-readout method involving addition average of the second number of pixels to generate the image data is subjected to color blur suppression to a larger extent than the gradient value range when the image sensor is driven by the first addition readout method involving addition average of the first number of pixels.

3. An image processing apparatus comprising:
a filtering unit configured to apply band limitation to image data;
a gradient detection unit configured to obtain a gradient value from the image data that is band-limited by the filtering unit;
a suppression coefficient calculation unit configured to calculate a suppression coefficient based on the gradient value;
a suppression unit configured to perform image processing to suppress color blur in an area of the image data to be subjected to color blur suppression, based on the suppression coefficient,
wherein the suppression coefficient calculation unit sets a pass band to be limited by the filtering unit so that the pass band limited by the filtering unit when an image sensor is driven by an addition-readout method to generate the image data is narrower than the pass band limited by the filtering unit when the image sensor is driven by a non-addition readout method.

4. An image processing apparatus comprising:
a filtering unit configured to apply band limitation to image data;
a gradient detection unit configured to obtain a gradient value from the image data band-limited by the filtering unit;
a suppression coefficient calculation unit configured to calculate a suppression coefficient based on the gradient value;
a suppression unit configured to perform image processing to suppress color blur in an area of the image data to be subjected to color blur suppression, based on the suppression coefficient,
wherein the suppression coefficient calculation unit sets a pass band to be limited by the filtering unit so that the pass band limited by the filtering unit when an image sensor is driven by a second addition-readout method involving addition average of a second number of pixels to generate the image data is narrower than the pass band limited by the filtering unit when the image sensor is driven by a first addition readout method involving addition average of a first number of pixels, wherein the second number is larger than the first number.

5. A method for processing an image data comprising:
obtaining a gradient value from image data;
calculating a suppression coefficient based on the gradient value;
performing image processing to suppress color blur in an area of the image data to be subjected to color blur suppression, calculating the suppression coefficient so as to suppress color blur in the area to be subjected to color blur suppression, and wherein setting the threshold value so that a gradient value range required for color blur suppression when an image sensor is driven by an addition readout method to generate the image data is wider than a gradient value range required when the image sensor is driven by a non-addition readout method; wherein calculating the suppression coefficient unit so that a gradient value range when the image sensor is driven by an addition-readout method to generate the image data is subjected to color blur suppression to a larger degree than a gradient value range when the image sensor is driven by a non-addition readout method.

6. A non-transitory computer-readable storage medium that stores a program for causing a computer to execute the method for processing image data according to claim 5.

7. A method for processing image data comprising:
obtaining a gradient value from image data;
calculating a suppression coefficient based on the gradient value;
performing image processing to suppress color blur in an area of the image data to be subjected to color blur suppression, based on the suppression coefficient, wherein, when the gradient value exceeds a threshold value, calculating the suppression coefficient so as to suppress color blur in the area to be subjected to color blur suppression, and wherein setting the threshold value so that the gradient value range required for color blur suppression when an image sensor is driven by a second addition readout method involving addition average of the second number of pixels to generate the image data is wider than the gradient value range required when the image sensor is driven by a first addition readout method involving addition average of a first number of pixels, wherein the second number is larger than the first number; and wherein calculating the suppression coefficient so that the gradient value range when the image sensor is driven by the second addition-readout method involving addition average of the second number of pixels to generate the image data is subjected to color blur suppression to a larger extent than the gradient value range when the image sensor is driven by the first addition readout method involving addition average of the first number of pixels.

8. A non-transitory computer-readable storage medium that stores a program for causing a computer to execute the method for processing image data according to claim 7.

9. A method for processing image data, comprising:
applying band limitation to image data;
obtaining a gradient value from the band-limited image data;
calculating a suppression coefficient based on the gradient value;
performing image processing to suppress color blur in an area of the image data subjected to color blur suppression, based on the suppression coefficient,
wherein setting a pass band to be limited by the filtering process so that the pass band limited by the filtering process when an image sensor is driven by an addition-readout method to generate the image data is narrower than the limited pass when the image sensor is driven by a non-addition readout method.

10. A non-transitory computer-readable storage medium that stores a program for causing a computer to execute the method for processing image data according to claim 9.

11. A method for processing image data, comprising:
applying band limitation to image data;
obtaining a gradient value from the band-limited image data;
calculating a suppression coefficient based on the gradient value;
performing image processing to suppress color blur in an area of the image data subjected to color blur suppression, based on the suppression coefficient,
wherein setting a pass band to be limited by the filtering process so that the pass band limited by the filtering process when an image sensor is driven by a second addition-readout method involving addition average of a second number of pixels to generate the image data is narrower than the limited pass when the image sensor is driven by a first addition readout method involving addition average of a first number of pixels, wherein the second number is larger than the first number.

12. A non-transitory computer-readable storage medium that stores a program for causing a computer to execute the method for processing image data according to claim 11.

* * * * *